(12) United States Patent
Waida et al.

(10) Patent No.: US 8,633,611 B2
(45) Date of Patent: Jan. 21, 2014

(54) MOTORCYCLE

(75) Inventors: Kazuma Waida, Kobe (JP); Kenichi Jino, Kakogawa (JP); Manabu Kokawa, Akashi (JP); Shunsaku Ono, Yokohama (JP); Junya Iwatsuki, Yokohama (JP)

(73) Assignees: Kawasaki Jukogyo Kabushiki Kaisha, Kobe-shi (JP); Bosch Corporation, Tokyo (JP)

( * ) Notice: Subject to any disclaimer, the term of this patent is extended or adjusted under 35 U.S.C. 154(b) by 660 days.

(21) Appl. No.: 12/893,170

(22) Filed: Sep. 29, 2010

(65) Prior Publication Data

US 2011/0080043 A1    Apr. 7, 2011

(30) Foreign Application Priority Data

Oct. 2, 2009  (JP) ................................. 2009-230761

(51) Int. Cl.
  *B60L 1/00*  (2006.01)
  *B60L 3/00*  (2006.01)
  *H02G 3/00*  (2006.01)

(52) U.S. Cl.
  USPC ......................................................... 307/9.1

(58) Field of Classification Search
  USPC ........................................ 307/9.1; 180/65.24
  See application file for complete search history.

(56) References Cited

U.S. PATENT DOCUMENTS

| 5,129,713 A | 7/1992 | Matsuda |
| 2004/0036356 A1 | 2/2004 | Bischof et al. |
| 2009/0118961 A1 | 5/2009 | Eckert et al. |

FOREIGN PATENT DOCUMENTS

| DE | 102007019039 A1 | 11/2007 |
| EP | 0125660 A2 | 11/1984 |
| EP | 0175843 A2 | 4/1986 |
| JP | 2000-062589 A | 2/2000 |
| JP | 2005-280569 A | 10/2005 |
| WO | 03016097 A1 | 2/2003 |

OTHER PUBLICATIONS

ISA European Patent Office, Extended European Search Report of EP10181054.7, Feb. 4, 2013, Germany, 7 pages.

*Primary Examiner* — Carlos Amaya (74) *Attorney, Agent, or Firm* — Alleman Hall McCoy Russell & Tuttle LLP (57) ABSTRACT

A motorcycle comprises an electricity accumulator configured to supply electric power to driving devices required for driving of the motorcycle and to non-driving devices; a voltage detector configured to detect a voltage of the electricity accumulator; and a power supply controller configured to control supply of the electric power; the non-driving devices including electric motor devices in an electric motor braking system configured to be electrically driven to assist braking and non-driving electric motor devices other than the electric motor devices in the electric motor braking system; and the power supply controller being configured to inhibit the electric power from being supplied to at least one specified non-driving electric motor device of the non-driving electric motor devices, when the voltage of the electricity accumulator which is detected by the voltage detector is not more than a first predetermined voltage.

16 Claims, 7 Drawing Sheets

PRIOR ART

MOTORCYCLE

CROSS-REFERENCE TO RELATED APPLICATIONS

The present application claims priority from Japanese Patent Application No. 2009-230761 filed on Oct. 2, 2009, which is hereby incorporated by reference in its entirety for all purposes.

FIELD OF THE INVENTION

The present invention relates to a motorcycle including an electric motor braking system configured to perform an anti-lock operation, etc.

DESCRIPTION OF THE RELATED ART

An electric motor braking system configured to electrically control a brake and to assist braking in an automobile is known. Japanese Laid-Open Patent Application Publication Nos. 2005-280569 and 2000-62589 disclose electric motor braking systems for ensuring a braking force even when a voltage of a battery is low. To be specific, Publication No. 2005-280569 discloses that a timing at which the electric motor braking system is activated is set earlier to ensure a braking force under a low-voltage condition. Publication No. 2000-62589 discloses that a braking force is not changed in a range where a change in an extent to which the brake is applied is less, to ensure a braking force under a low-voltage condition. Recently, motorcycles have been developed to include an anti-lock braking system configured to perform an anti-lock operation.

Figure 7A:
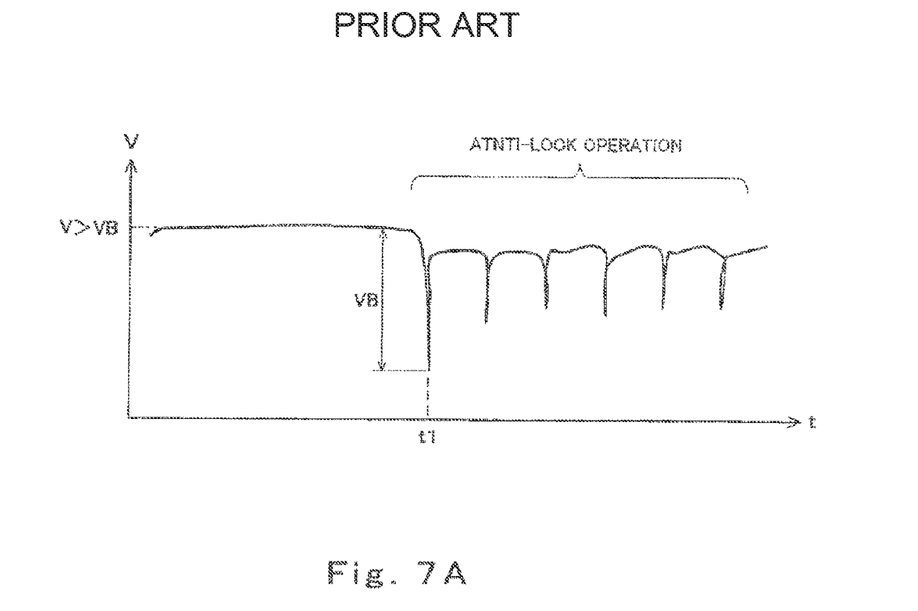
FIG. 7 is a view showing a change in a battery voltage during an anti-lock operation.
Figure 7B:
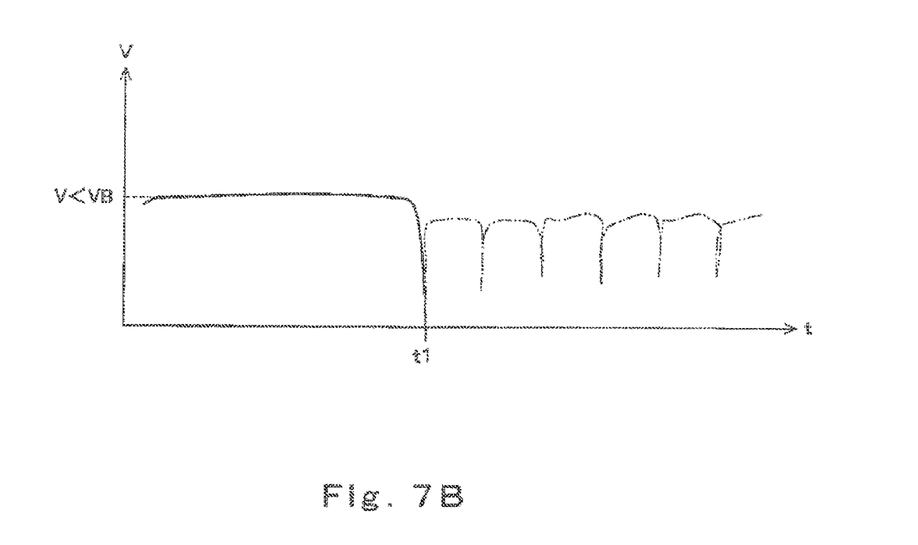

FIGS. 7A and 7B are views showing a change in a battery voltage during an anti-lock operation. FIG. 7A shows that the battery voltage is in a normal state, while FIG. 7B shows that the battery voltage is in a low-voltage state. As shown in FIGS. 7A and 7B, at time t1, the anti-lock operation starts. As shown, a more inrush current flows when the anti-lock operation is starting than when the anti-lock operation is going on, and therefore, a higher voltage (minimum braking voltage VB required for the anti-lock operation) is required, at the start of the anti-lock operation. That is, as shown in FIG. 7A, a battery voltage drastically drops for a moment at the start of the anti-lock operation. Therefore, as can be seen from FIG. 7B, the minimum braking voltage VB required for the anti-lock operation cannot be sometimes ensured in situations where a voltage V of the battery is low due to deterioration of the battery, electric power consumption by other electric components, etc.

This problem remains unsolved in Publication Nos. 2005-280569 and 2000-62589, because the invention is made based on assumption that the minimum braking voltage VB required for the anti-lock operation can be ensured.

SUMMARY OF THE INVENTION

The present invention addresses the above conditions, and an object of the present invention is to provide a motorcycle which is capable of increasing a period during which an electric motor braking system is operative even under a state where a voltage of an electricity accumulator such as a battery is low.

According to a first aspect of the present invention, there is provided a motorcycle comprising: an electricity accumulator configured to supply electric power to driving devices required for driving of the motorcycle and to non-driving devices; a voltage detector configured to detect a voltage of the electricity accumulator; and a power supply controller configured to control supply of the electric power; the non-driving devices including electric motor devices in an electric motor braking system configured to be electrically driven to assist braking and non-driving electric motor devices other than the electric motor devices in the electric motor braking system; and the power supply controller being configured to inhibit the electric power from being supplied to at least one specified non-driving electric motor device of the non-driving electric motor devices, when the voltage of the electricity accumulator which is detected by the voltage detector is not more than a first predetermined voltage.

In accordance with such a configuration, since the supply of the electric power to the specified non-driving electric motor device other than the electric motor braking system, which is not directly related to driving of the motorcycle, is inhibited when the voltage of the electricity accumulator is low, it is possible to increase a period during which the electric motor braking system is operative.

The electric motor braking system may include an anti-lock operation unit configured to repeatedly switch between a braking state and a non-braking state; and a combined braking unit configured to, when a braking force is applied to one of front and rear wheels, apply the braking force to the other of the front and rear wheels. The power supply controller may be configured to restrict an operation of the combined braking unit while maintaining an operation of the anti-lock operation unit, when the voltage of the electricity accumulator which is detected by the voltage detector is not more than a second predetermined voltage.

In accordance with such a configuration, since the operation of the combined braking unit in the electric motor braking system is restricted while maintaining the operation of the anti-lock operation unit when the voltage of the electricity accumulator is low, the anti-lock operation can ensure its operating voltage and operate for a longer time.

The first voltage may be not less than the second voltage.

In this case, when the voltage of the electricity accumulator is not more than the first voltage, supply of the electric power to at least one specified non-driving electric motor device is inhibited, and when the voltage of the electricity accumulator is not more than the second voltage, which is not more than the first voltage, the operation of the combined braking unit is restricted. That is, if the electric motor braking system can ensure its operating voltage merely by inhibiting the supply of the electric power to the specified non-driving electric motor device, the operation of the combined braking unit is performed without restriction, thereby effectively assisting driving of the motorcycle.

The electric motor braking system may have a normal-voltage mode and a low-voltage mode in which the electric motor braking system is operative at a lower voltage than in the normal-voltage mode; and the power supply controller may be configured to switch the electric motor braking system from the normal-voltage mode to the low-voltage mode when the voltage of the electricity accumulator, which is detected by the voltage detector, is not more than a third voltage which is not more than the first voltage.

By causing the electric motor braking system to switch to the low-voltage mode in which the electric motor braking system is operative at a lower voltage than in the normal-voltage mode even when the voltage of the electric accumulator decreases to a lower voltage, the electric motor braking system can be operative.

The electric motor braking system may include an anti-lock operation unit configured to repeatedly switch between a braking state and a non-braking state; and a combined braking unit configured to when a braking force is applied to one of the front and rear wheels, apply the braking force to the other of the front and rear wheels. The anti-lock operation unit may have a normal-voltage mode and a low-voltage mode in which the electric motor braking system is operative at a lower voltage than in the normal-voltage mode. The power supply controller may be configured to restrict an operation of the combined braking unit when the voltage of the electricity accumulator, which is detected by the voltage detector, is not more than a second predetermined voltage, and cause the anti-lock operation unit to switch from the normal-voltage mode to the low-voltage mode when the voltage of the electricity accumulator, which is detected by the voltage detector, is not more than a third voltage which is not more than the second voltage.

In this case, when the voltage of the electricity accumulator is not more than the second voltage, the operation of the combined braking unit is restricted, and when the voltage of the electricity accumulator is not more than the third voltage, which is not more than the second voltage, the anti-lock operation unit is switched from the normal-voltage mode to the low-voltage mode. Since the operation of the combined braking unit is restricted in a stepwise manner and the mode of the anti-lock operation unit is changed in a stepwise manner, the electric motor braking system can assist driving of the motorcycle more effectively.

The anti-lock operation unit may be configured to continue the low-voltage mode from when the anti-lock operation unit has transitioned to the low-voltage mode until an ignition switch is turned OFF.

In accordance with such a configuration, once the anti-lock operation unit has transitioned to the low-voltage mode, the low-voltage mode continues until the ignition switch is turned OFF even if the voltage of the electricity accumulator is restored to a voltage higher than the second voltage. If the anti-lock operation unit is operated in the normal-voltage mode in situations where the electricity accumulator is possibly deteriorated and insufficiently charged, a drastic voltage drop of the electricity accumulator may be induced. Once the voltage of the electricity accumulator has reached the second voltage or less, a drastic voltage drop can be prevented and the period during which the motorcycle can drive can be increased by maintaining the low-voltage mode.

The motorcycle may further comprise a display device configured to perform a display operation to inform a driver that the anti-lock operation unit is in the low-voltage mode.

In accordance with such a configuration, the display device performs a display operation to indicate that the anti-lock operation unit is in the low-voltage mode to inform the driver that the anti-lock operation unit has transitioned to the low-voltage mode. In addition, once the anti-lock operation unit has transitioned to the low-voltage mode, the display device continues to perform the display operation until the ignition switch is turned OFF even if the voltage of the electricity accumulator is restored to a value which is not less than the second voltage. This enables the driver to notice that the electricity accumulator is possibly deteriorated or insufficiently charged.

According to another aspect of the present invention, there is provided a method of controlling a motorcycle including an electric motor braking system configured to be electrically driven to assist driving of the motorcycle, and an electricity accumulator configured to supply electric power to the electric motor braking system; the electric motor braking system including an anti-lock operation unit configured to repeatedly switch between a braking state and a non-braking state; and a combined braking unit configured to, when a braking force is applied to one of front and rear wheels, apply the braking force to the other of the front and rear wheels, the method comprising: detecting a voltage of the electricity accumulator, and restricting an operation of the combined braking unit while maintaining an operation of the anti-lock operation unit, when the voltage of the electricity accumulator is not more than a second predetermined voltage.

In accordance with such a configuration, since the operation of the combined braking unit in the electric motor braking system is inhibited when the voltage of the electricity accumulator is low, the anti-lock operation unit can ensure its operating voltage and operate for a longer time.

The above and further objects and features of the invention will more fully be apparent from the following detailed description with reference to accompanying drawings.

DETAILED DESCRIPTION OF THE EMBODIMENT

Hereinafter, an embodiment of the present invention will be described with reference to the drawings. Throughout the drawings, the same or corresponding constituents are designated by the same reference characters, and will not be described repetitively. The stated directions are referenced from the perspective of a driver straddling a motorcycle, unless otherwise explicitly noted.

Figure 1:
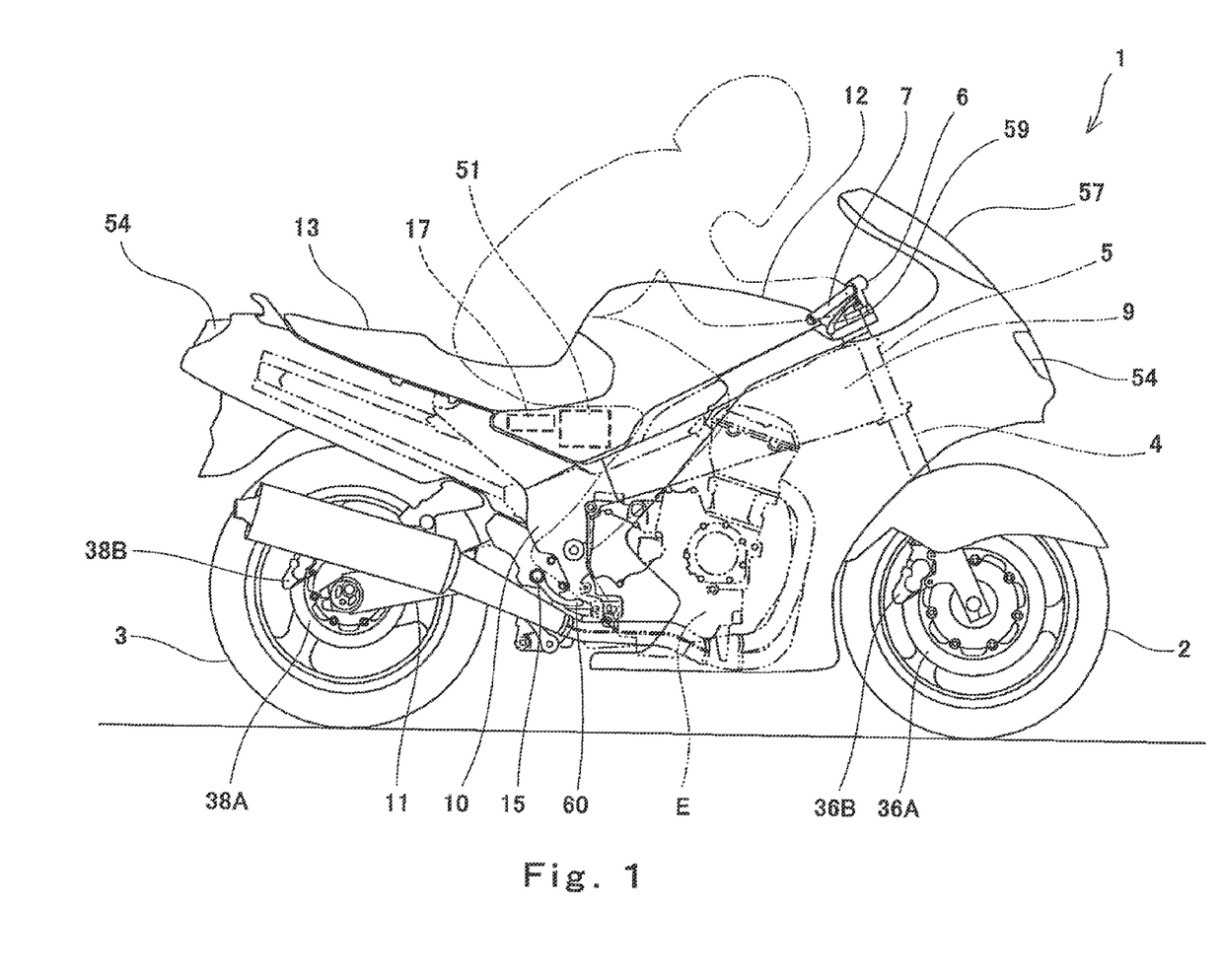
FIG. 1 is a right side view showing a motorcycle according to an embodiment of the present invention.

FIG. 1 is a right side view showing a motorcycle according to an embodiment of the present invention. Referring to FIG. 1, the motorcycle 1 includes a front wheel 2 and a rear wheel 3 which roll on a road. The rear wheel 3 is a drive wheel and the front wheel 2 is a driven wheel. The front wheel 2 is rotatably mounted to the lower end portion of a front fork 4 extending substantially vertically. The front fork 4 is attached to a steering shaft (not shown) via an upper bracket (not shown) provided at an upper end portion thereof and an under bracket (not shown) provided under the upper bracket. The steering shaft is rotatably supported by a head pipe 5. A bar-type steering handle 6 extending rightward and leftward is attached to the upper bracket. Front wheel brake discs 36A are fastened to the right and left portions of the front wheel 2. A front wheel brake caliper 36B is mounted to the lower end portion of the front fork 4. The front wheel brake discs 36A and the front wheel brake caliper 36B constitute a front wheel brake 36 (see FIG. 2). A piston (not shown) of the front wheel brake caliper 36B is pressed against the front wheel brake discs 36A by an oil pressure, thereby generating a braking force.

A throttle grip 7 is provided at a portion of the steering handle 6 which is gripped by the driver's right hand. The throttle grip 7 is a throttle operation device which is rotated by twisting the driver's wrist to operate a throttle device 16 (see FIG. 2) as described later. A brake lever 59 is provided in front of the throttle grip 7 to substantially activate the front wheel brake 36. A clutch lever 8 (see FIG. 2) is provided in front of a grip provided at a portion of the steering handle 6 which is gripped by the driver's left hand. The driver rotates the steering handle 6 to rotate the front wheel 2 around the steering shaft which is a rotational shaft, in a desired direction.

A pair of right and left main frame members 9 extend rearward in a downward direction from the head pipe 5. A pair of right and left pivot frame members 10 are coupled to the rear portions of the main frame members 9, respectively. The front end portions of swing arms 11 extending substantially in the longitudinal direction of the motorcycle 1 are coupled to the pivot frame members 10, respectively such that each swing arm 11 is pivotable around the front end portion. The rear wheel 3 is rotatably mounted to the rear portion of the swing arm 11. A fuel tank 12 is provided behind the steering handle 6. A seat 13 straddled by the driver is provided behind the fuel tank 12. A rear wheel brake disc 38A is fastened to the right portion of the rear wheel 3. A rear wheel brake caliper 38B is mounted to the rear end portion of the swing arm 11. The rear brake disc 38A and the rear wheel brake caliper 38B constitute a rear wheel brake 38 (see FIG. 2). A piston (not shown) of the rear wheel brake caliper 38B is pressed against the rear wheel brake disc 38A by an oil pressure, thereby generating a braking force. Right and left steps 15 are respectively provided below and at right and left sides of the seat 13 to allow the driver's feet to rest thereon. A brake pedal 60 extending forward is pivotally mounted to the right step 15. The driver depresses the brake pedal 60 to substantially activate the rear wheel brake 38.

An engine E is mounted to the main frame members 9 and the pivot frame members 10, between the front wheel 2 and the rear wheel 3. In FIG. 1, as the engine E, an inline four-cylinder engine is depicted. A transmission 14 (see FIG. 2) is coupled to the output shaft of the engine E. A driving power is transmitted from the transmission 14 to the rear wheel 3 via a chain (not shown). The throttle device 16 (see FIG. 2) is disposed inward relative to the main frame members 9 and coupled to intake ports (not shown) of the engine E. An air cleaner 19 (see FIG. 2) is disposed below the fuel tank 12 and coupled to the upstream portion of the throttle device 16 in an air flow direction. The air cleaner 19 is configured to take in outside air by utilizing a wind pressure from forward. In an inner space below the seat 13, an engine ECU (Electronic Control Unit) 17 which is an engine controller configured to control the throttle device 16, an ignition device 26 (see FIG. 2), a fuel injection device (injector 31 see FIG. 2), etc., and a battery 51 which is an electricity accumulator for supplying the electric power to the ignition device 26, the injector 31, the engine ECU 17, etc are accommodated. The electricity accumulator is a device for storing the electric power externally supplied. The electricity accumulator is a battery which is a secondary battery, but not limited to this, and may be, for example, a capacitor.

Figure 2:
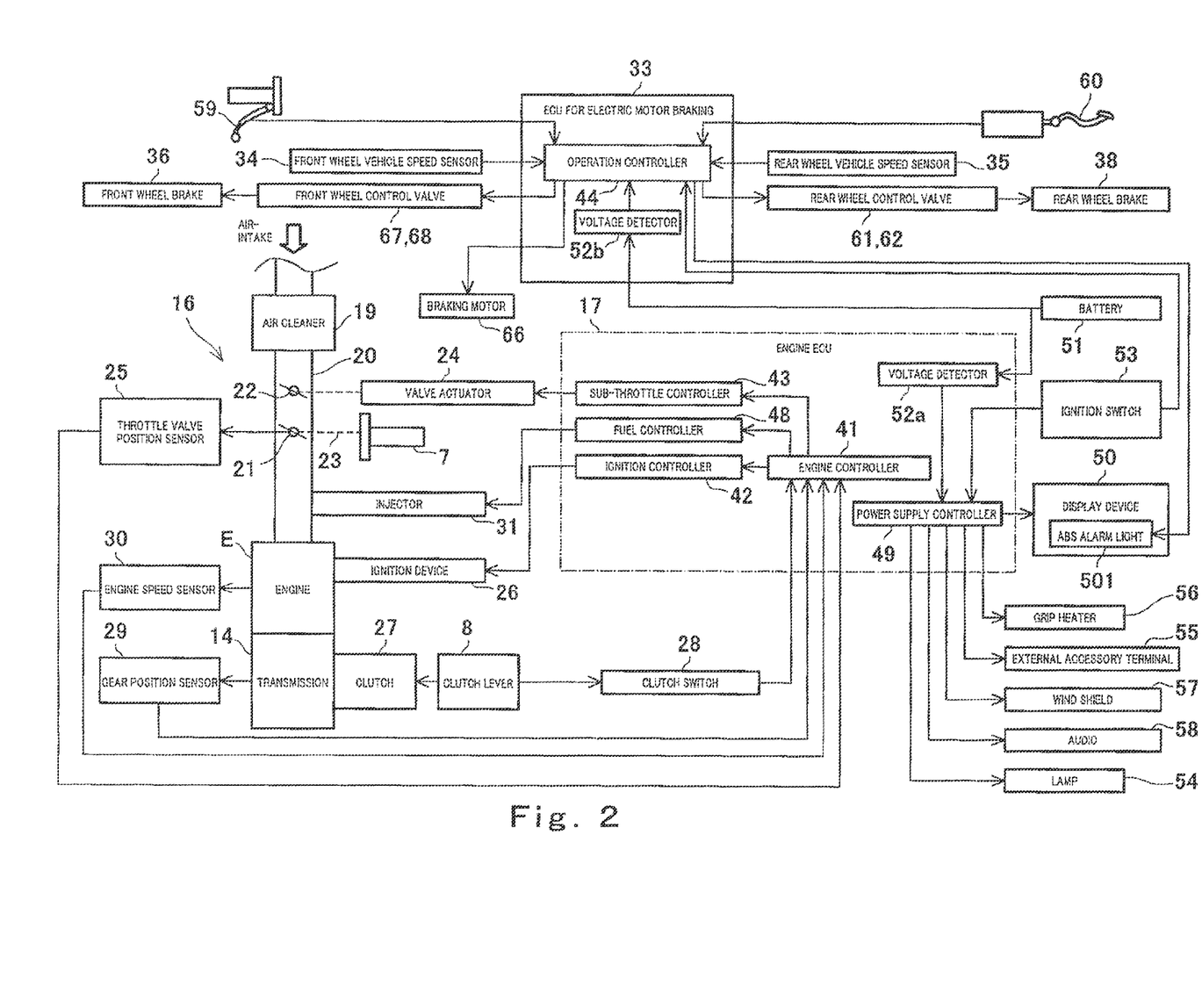
FIG. 2 is a block diagram showing a configuration of a control system built into the motorcycle of FIG. 1.

FIG. 2 is a block diagram showing a configuration of a control system built into the motorcycle 1 of FIG. 1. As shown in FIG. 2, the air cleaner 19 is provided at a portion of an air-intake pipe 20 coupling an air inlet (not shown) to the engine E. The throttle device 16 is provided between the air cleaner 19 and the engine E. The throttle device 16 includes a main throttle valve 21 provided in a portion of the air-intake pipe 20, and a sub-throttle valve 22 provided in the air-intake pipe 20 in a location upstream of the main throttle valve 21 in the air flow direction. The main throttle valve 21 is coupled to the throttle grip 7 via a throttle wire 23 and is configured to open and close in association with the driver's operation of the throttle grip 7. The main throttle valve 21 is attached with a throttle valve position sensor (throttle valve opening degree sensor) 25 configured to detect the opening degree of the main throttle valve 21. The main throttle valve 21 is mechanically operable in association with the throttle grip 7 via the throttle wire 23. The throttle valve position sensor 25 also serves as a throttle device operation amount detector which is indirectly capable of detecting the degree to which the throttle grip 7 is open.

The sub-throttle valve 22 is coupled to a valve actuator 24 constituted by a motor controlled by the engine ECU 17. The sub-throttle valve 22 is actuated by the valve actuator 24 to open and close. The throttle device 16 is provided with the injector 31 configured to inject a fuel to an air-intake passage connected to the air-intake pipe 20. The engine E is provided with ignition devices 26 each of which ignites an air-fuel mixture in a corresponding one of four cylinders. As described above, the transmission 14 is coupled to the engine E and configured to change the speed of the driving power generated in the engine E and to transmit the resulting driving power to the rear wheel 3.

The transmission 14 is attached with a clutch 27 configured to permit and inhibit transmission of the driving power to the rear wheel 3. The clutch 27 is configured to inhibit the driving power from being transmitted to the rear wheel 3 when the driver grips the clutch lever 8. The clutch lever 8 is attached with a clutch switch (clutch operation detector) 28 configured to detect whether or not the clutch lever 8 has been gripped by the driver. The transmission 14 is attached with a gear position sensor 29 configured to detect a transmission gear position.

In this embodiment, the motorcycle 1 includes an electric motor braking system including an anti-lock operation unit serving as an anti-lock braking system and a combined braking unit serving as a combined braking system. The electric motor braking system includes an ECU 33 for electric motor braking. A front wheel vehicle speed sensor 34 configured to detect a front wheel vehicle speed from the rotation number of the front wheel 2 and a rear wheel vehicle speed sensor 35 configured to detect a rear wheel vehicle speed from the rotation number of the rear wheel 3 are electrically coupled to the ECU 33. Front wheel control valves 67 and 68 used to activate the front wheel brake 36 and rear wheel control valves 61 and 62 used to activate the rear wheel brake 38 are electrically coupled to the ECU 33.

The ECU 33 includes an operation controller 44 serving as a controller configured to control supply of electric power to the anti-lock operation unit and the combined braking unit, and a voltage detector 52b configured to detect a voltage of the battery 51. The voltage detector 52b is configured to detect a voltage applied to the input terminal of the ECU 33 to which the electric power is supplied from the battery 51 to detect the voltage of the battery 51.

The operation controller 44 is configured to control supply of the electric power to the electric motor devices based on a detection signal received from the voltage detector 52b and an ON/OFF signal received from an ignition switch 53 configured to command power ON and power OFF of the motorcycle 1. In other words, in this embodiment, the operation controller 44 of the ECU 33 serves as the power supply controller.

The engine ECU 17 is electrically coupled to the throttle valve position sensor 25, the clutch switch 28, the gear position sensor 29 and the engine speed sensor 30. The engine ECU 17 includes an engine controller 41, an ignition controller 42, a fuel controller 48, a sub-throttle controller 43, a power supply controller 49 and a voltage detector 52a configured to detect the voltage of the battery 51. The voltage detector 52a is configured to detect the voltage applied to the input terminal of the engine ECU 17 to which the electric power is supplied from the battery 51 to detect the voltage of the battery 51. The engine controller 41 is configured to calculate values relating to engine control based on the signals received from the sensors 25, 29, 30 and the switch 28. The ignition controller 42 is configured to control the ignition device 26 based on the value calculated in the engine controller 41. The fuel controller 48 is configured to control the injector 31 based on the value calculated in the engine controller 41. The sub-throttle controller 43 is configured to drive the valve actuator 24 and control the opening degree of the sub-throttle valve 22 based on the value calculated in the engine controller 41. The motorcycle 1 includes a display device 50 positioned to enable the driver to see the display device 50. The display device 50 is configured to perform a display operation based on the values calculated in the engine ECU 17. The display device 50 includes a display unit (ABS alarm light) 501 which lights up to inform the driver of a failure of the anti-lock operation unit.

The power supply controller 49 is configured to control supply of the electric power to the electric motor devices based on the detection value of the voltage detector 52a configured to detect the voltage of the battery 51 and an ON/OFF signal from the ignition switch 53 configured to command power ON and power OFF of the motorcycle 1. In other words, in this embodiment, the power supply controller 49 of the engine ECU 17 serves as a power supply controller for controlling electric power supply.

In this embodiment, as described above, the voltage detectors 52a and 52b are built into the engine ECU 17 and the ECU 33, respectively. The voltage detectors 52a and 52b are configured to detect the voltage applied to the engine ECU 17 and the voltage applied to the ECU 33, respectively, to detect the voltage of the battery 51. This makes it possible to detect the actual voltage applied to the input terminal of the engine ECU 17 and the actual voltage applied to the input terminal of the ECU 33. Therefore, the voltages used in the determination steps described later can be detected with high accuracy. The configuration of the voltage detectors is not limited to this so long as they are capable of detecting the voltage of the battery 51. For example, one or a plurality of voltage detectors may be provided outside each of the engine ECU 17 and the ECU 33, or a terminal-to-terminal voltage of the battery 51 may be directly detected.

The electric motor devices include driving devices and non-driving devices. The driving devices include the ECU 17, the ECU 33, the sensors 25, 29, 30, 34, and 35 and the actuators 24, 26, and 31. In other words, the driving devices are electric-drive devices required to drive the motorcycle 1. The driving devices also include electric motor devices for driving the engine E and light-up devices. The electric motor devices for driving the engine E include, for example, engine starting devices such as the ignition switch 53, ignition-related devices such as the ignition device, air-intake devices such as the fuel injection device and the electric motor throttle valves, cooling devices such as a cooling fan, sensors used for controlling driving of the engine, and the engine ECU 17 which is the engine controller. The light-up devices include a head lamp for emitting light in a forward direction, a position lamp, a tail lamp provided at the rear portion of a vehicle body to inform a position of the vehicle body, a stop lamp for informing that the brake is operating, and blinkers for lighting-up to indicate a right turn or a left turn of the vehicle body. In addition to these, the driving devices may include meter devices (display device 50, etc.) for informing the driver of current states of the vehicle body of the motorcycle 1 as the vehicle speed, the engine speed, the operating states of the devices, etc.

The non-driving devices include the front wheel control valves 67 and 68, the rear wheel control valve 61 and 62 and a braking motor 66 as described later, in the electric motor braking system, and other non-driving electric motor devices, such as external accessories additionally coupled to the vehicle body via an external accessory terminal 55, a grip heater 56 for heating the grips 6 and 7, an electric motor wind shield 57 which is capable of electrically adjusting a shield angle, audio 58, etc. That is, the motorcycle 1 can drive in a state where the electric power is not supplied to the non-driving devices. The battery 51 supplies the electric power to the driving devices and the non-driving devices.

Figure 3:
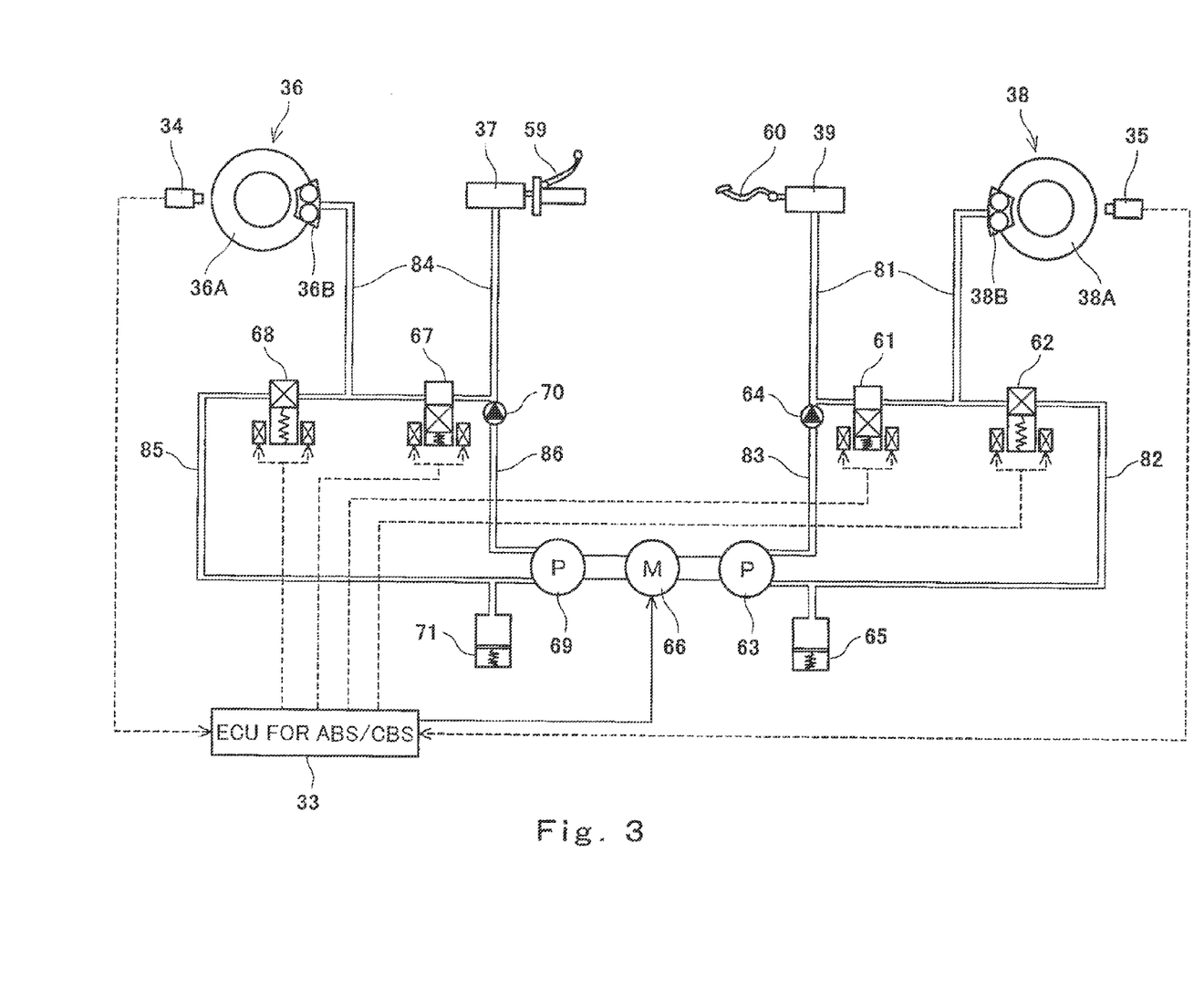
FIG. 3 is a view showing a hydraulic system of an electric motor braking system according to the embodiment.

Now, the electric motor braking system of this embodiment will be described in more detail. In this embodiment, the electric motor braking system is constructed to include a combination of the anti-lock operation unit and the combined braking unit. FIG. 3 is a view showing a hydraulic system of the electric motor braking system of this embodiment.

Referring to FIG. 3, the brake pedal 60 is provided with a rear wheel brake master cylinder 39 to increase or decrease the oil pressure in a rear wheel oil passage according to the degree to which the brake pedal 60 is depressed. The first rear wheel control valve 61 is provided in a rear wheel main oil passage 81 connecting the rear wheel brake master cylinder 39 to the rear wheel brake caliper 38B of the rear wheel brake 38 and is configured to open and close under control of the ECU 33. A rear wheel depressurization oil passage 82 branches from the rear wheel main oil passage 81 in a location between the first rear wheel control valve 61 and the rear wheel caliper 38B and leads to a suction port of a rear wheel oil pump 63. The second rear wheel control valve 62 is provided in the rear wheel depressurization oil passage 82, and configured to open and close under control of the ECU 33. A rear wheel oil reservoir 65 is provided in the rear wheel depressurization oil passage 82 in a location between the second rear wheel control valve 62 and the rear wheel oil pump 63. A rear wheel pressurization oil passage 83 is coupled to the rear wheel main oil passage 81 in a location between the rear wheel brake master cylinder 39 and the first rear wheel control valve 61 and coupled to a discharge outlet of the rear wheel oil pump 63. A rear wheel one-way valve 64 is provided in the rear wheel pressurization oil passage 83. A rear wheel oil pump 63 is coupled to the braking motor 66 controlled by the ECU 33. The braking motor 66 is rotated, thereby controlling the oil pressure of the hydraulic oil discharged from the rear wheel oil pump 63.

The brake lever 59 is provided with a front wheel brake master cylinder 37. The oil pressure in front wheel oil passages is increased or decreased according to the degree to which the brake lever 59 is gripped. The first front wheel control valve 67 is provided in a front wheel main oil passage 84 connecting the front wheel brake master cylinder 37 to the front wheel brake caliper 36B of the front wheel brake 36. The first front wheel control valve 67 is configured to open and close under control of the ECU 33, to be precise, the operation controller 44. A front wheel depressurization oil passage 85 branches from the front wheel main oil passage 84 in a location between the first front wheel control valve 67 and the front wheel brake caliper 36B and leads to a suction port of the front wheel oil pump 69. The second front wheel control valve 68 is provided in the front wheel depressurization oil passage 85 and configured to open and close under control of the ECU 33. A front wheel oil reservoir 71 is provided at the front wheel depressurization oil passage 85 in a location between the second front wheel control valve 68 and the front wheel oil pump 69. A front wheel pressurization oil passage 86 is coupled to the front wheel main oil passage 84 in a location between the front wheel brake master cylinder 37 and the first front wheel control valve 67 and coupled to a discharge outlet of a front wheel oil pump 69. A front wheel one-way valve 70 is provided in the front wheel pressurization oil passage 86. The front wheel oil pump 69 is coupled to the braking motor 66 controlled by the ECU 33, to be precise, the operation controller 44. The braking motor 66 is rotated, thereby controlling the oil pressure of the hydraulic oil discharged from the front wheel oil pump 69. Thus, in this embodiment, the electric motor braking system includes the combined braking unit including the braking motor 66, the front wheel oil pump 69 coupled to the braking motor 66 and the rear wheel oil pump 63 coupled to the braking motor 66. By controlling the braking motor 66, the braking force applied to the front wheel 2 and the braking force applied to the rear wheel 3 can be controlled in parallel.

In this embodiment, the electric motor braking system includes a hydraulic circuit capable of a braking operation even in a state where the oil pumps 63 and 69 are inoperative. To be specific, the electric motor braking system is configured to transmit the oil pressure according to the degree to which the brake pedal 60 is depressed, to the rear wheel brake caliper 38B, and to transmit the oil pressure according to the degree to which the brake lever 59 is gripped, to the front wheel brake caliper 36B, even under the state where the supply of the electric power to the braking motor 66 and the control valves 61, 62, 67 and 68 is stopped. Therefore, even under the state where the anti-lock operation unit and the combined braking unit are not electrically driven, the braking command input by the driver can be transmitted to the electric motor braking system. In other words, the electric motor braking system is equipped in the motorcycle 1 to assist driving, and may be regarded as a non-driving system (may be used as a non-electric-motor braking system), because the motorcycle 1 can drive even in a state where the electric motor braking system is not electrically driven.

Now, the anti-lock operation of the anti-lock operation unit in the electric motor braking system will be described. Hereinafter, the constituents and mechanisms associated with the rear wheel will be described. In normal braking, when the brake pedal 60 is depressed by the driver, the first rear wheel control valve 61 is opened and the second rear wheel control valve 62 is closed, and the hydraulic oil pressurized by the rear wheel brake master cylinder 39 according to the degree to which the brake pedal 60 is depressed is delivered to the rear wheel brake caliper 38B, thereby generating a braking force. The ECU 33 receives the vehicle speed of the front wheel 2 from the front wheel vehicle speed sensor 34 and the vehicle speed of the rear wheel 3 from the rear wheel vehicle speed sensor 35 and determines that the rear wheel 3 is locked when a difference between the front wheel vehicle speed and the rear wheel vehicle speed is a value which is not less than a predetermined value. Then, the ECU 33 moves the first rear wheel control valve 61 to a closed position and the second rear wheel control valve 62 to an open position. Further, the ECU 33 causes the braking motor 66 serving as the anti-lock operation unit to activate the rear wheel oil pump 63, so that the hydraulic oil pressurizing the rear wheel bake caliper 38B moves back to the rear wheel oil reservoir 65 and the oil pressure in the rear wheel brake caliper 38B decreases, thereby attenuating a braking force. As a result, the rear wheel 3 is unlocked, i.e., placed in a non-slip state. After the rear wheel 3 is unlocked, the first rear wheel control valve 61 is returned to an open position and the second rear wheel control valve 62 is returned to a closed position, thereby increasing the braking force. Thus, the anti-lock operation unit repeats a braking state and a non-braking state, thereby generating a proper braking force (applying a proper braking force to the wheels) while effectively inhibiting the wheel from being locked.

The anti-lock operation unit has a normal-voltage mode in which the anti-lock operation unit is executing the above control and a low-voltage mode in which the anti-lock operation unit is operative at a lower voltage than in the normal-voltage mode. As described later, the operation controller 44 switches the control mode of the ECU 33 according to the voltage of the battery 51 which is detected by the voltage detector 52b. In other words, the operation controller 44 in the ECU 33 serves as a controller (power supply controller) for the anti-lock operation unit.

Next, the combined braking operation of the combined braking unit in the electric motor braking system will be described. When the combined braking unit applies a braking force to one of the front wheel 2 and the rear wheel 3, the combined braking unit also applies the braking force to the other of the front and rear wheels 2 and 3. To be specific, as described above, when the brake pedal 60 is depressed by the driver, the first rear wheel control valve 61 is opened. Concurrently, the first front wheel control valve 67 is opened. At this time, with the second front wheel control valve 68 being closed, the braking motor 66 serving as the combined braking unit causes the front wheel oil pump 69 and the rear wheel oil pump 63 to be activated. Thereupon, the hydraulic oil reserved in the front wheel oil reservoir 71 is pumped to an oil passage between the front oil pump 69 and the front brake caliper 36B, while the hydraulic oil reserved in the rear wheel oil reservoir 65 is pumped to an oil passage between the rear wheel oil pump 63 and the rear wheel brake caliper 38B, to provide a boosted oil pressure, which generates a braking force applied to each of the front wheel 2 and the rear wheel 3. The ECU 33 causes the first front wheel control valve 67 and/or first rear wheel control valve 61 to open and close and the second front wheel control valve 68 and/or second rear wheel control valve 62 to open and close, and drives the braking motor 66, based on vehicle speed information received from the front wheel vehicle speed sensor 34 and the rear wheel vehicle speed sensor 35, in order to control the braking force applied to each of the front wheel 2 and the rear wheel 3. The similar operation occurs when the brake lever 59 is operated.

The combined braking unit has an operating mode in which the above control is executed and an operation restricting mode in which the above control is not executed and the hydraulic oil is not fed to the other wheel, as described later. The operation controller 44 switches the control mode of the ECU 33 according to the voltage detected by the voltage detector 52b as described later. In other words, the operation controller 44 in the ECU 33 serves as a controller (power supply controller) for the combined control unit.

Next, the power supply control of this embodiment will be described in mode detail.

The power supply controller 49 which serves as the controller for controlling electric power supply in this embodiment is configured to control the devices according to the status of the battery 51 which is detected by the voltage detector 52a built into the engine ECU 17. To be specific, when the voltage of the battery 51 which is detected by the voltage detector 52a is not more than a first predetermined voltage V1, the power supply controller 49 inhibits the electric power from being supplied to at least one non-driving electric motor device other than the electric motor braking system. When the voltage detected by the voltage detector 52b in the ECU 33 is not more than a second predetermined voltage V2, the operation controller 44 restricts the operation of the combined braking unit in the electric motor braking system while maintaining the operation of the anti-lock operation unit. When the voltage detected by the voltage detector 52b is not more than a third voltage V3 (V3≤V1) which is not more than the first voltage V1, the operation controller 44 switches the anti-lock operation unit from the normal-voltage mode to the low-voltage mode.

When the voltage detected by the voltage detector 52b is a predetermined fourth voltage V4 which is not more than the first voltage V1, the operation controller 44 in the ECU 33 inhibits the electric power from being supplied to the electric motor braking system. In other words, under the voltage V4 or less, the combined braking operation and the anti-lock operation do not occur.

The above identified first voltage V1 to fourth voltage V4 may be lower than a rated voltage of the battery 51 and higher than the minimum braking voltage VB required for the anti-lock operation. The relationship between the first voltage V1 and the second voltage V2 may be V1>V2, V1<V2, or V1=V2. The relationship between the second voltage V2 and the third voltage V3 may be V2>V3, V2<V3, or V2=V3. The fourth voltage V4 is desirably lower than the second voltage V2 and the third voltage V3 (V4<V2 and V3).

Figure 4:
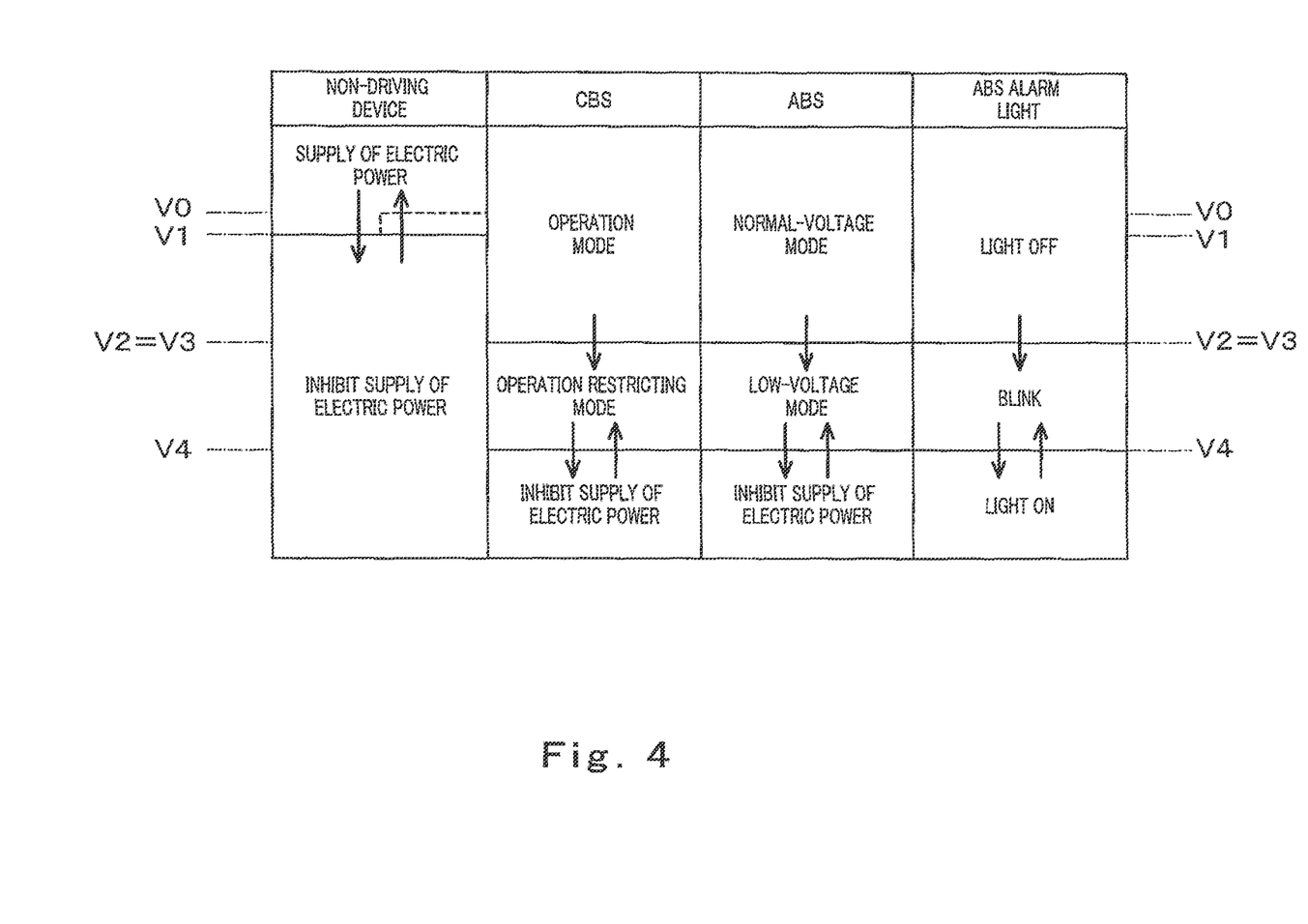
FIG. 4 is a view showing transition between electric power supply statues, between modes, and between operations.
Figure 5:
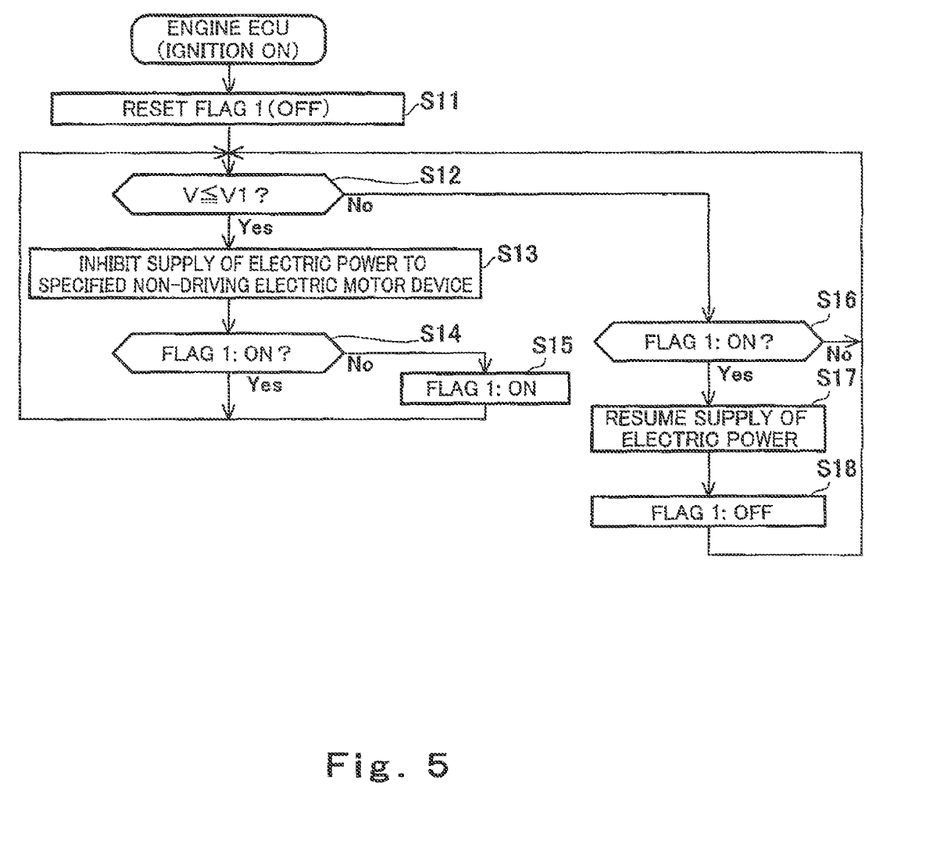
FIG. 5 is a flowchart showing electric power supply control in an engine ECU according to the embodiment.
Figure 6:
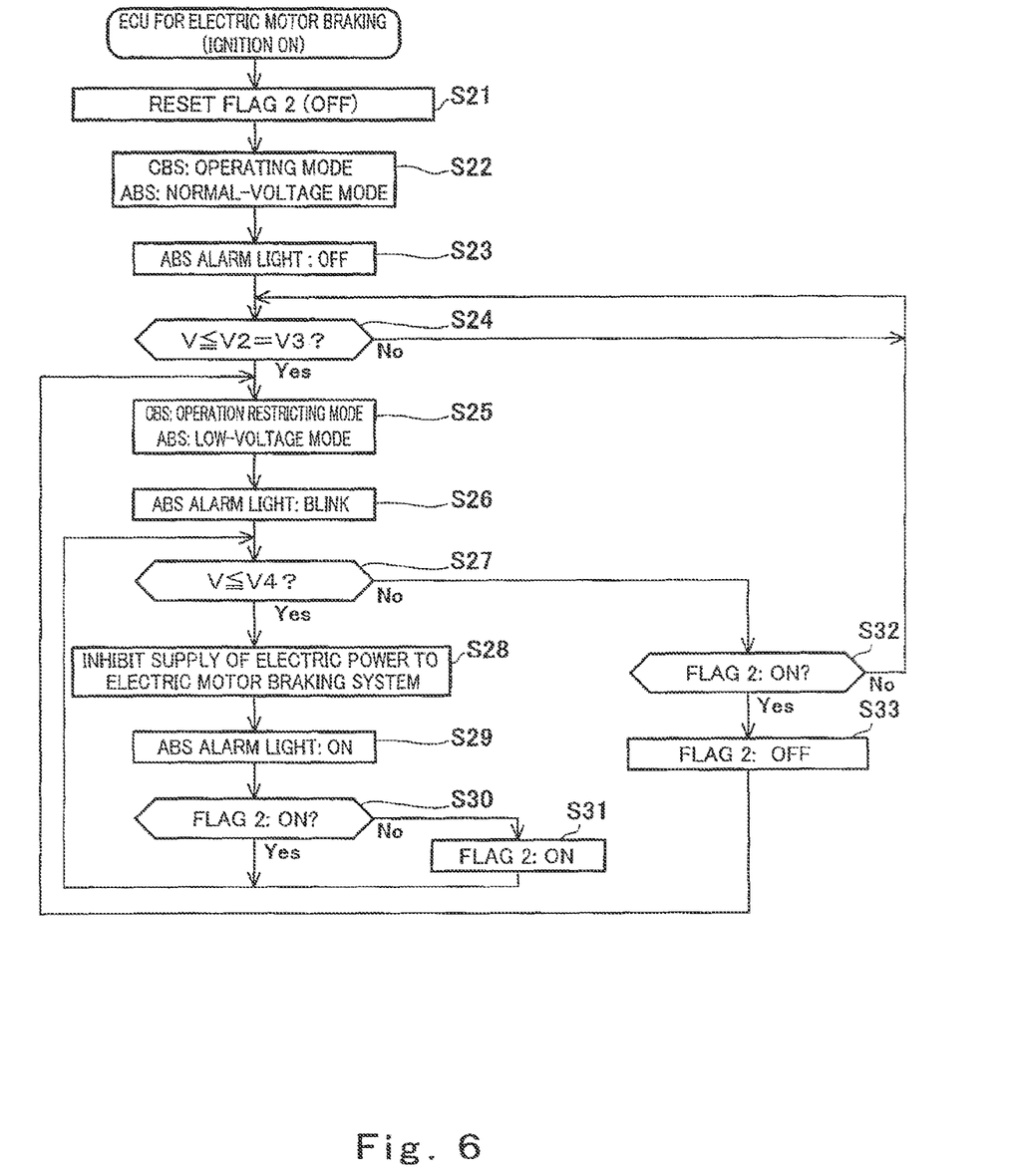
FIG. 6 is a flowchart showing electric power supply control in ECU for electric motor braking according to the embodiment.

Hereinafter, an exemplary flow of detailed power supply control in the case of (first voltage V1>second voltage V2=third voltage V3>fourth voltage V4>minimum braking voltage VB) will be described. FIG. 4 is a view showing transition between electric power supply statues, between modes and between operations. FIGS. 5 and 6 are flowcharts of the electric power supply control according to this embodiment. FIG. 5 shows a control process executed by the engine ECU 17 and FIG. 6 shows a control process executed by the ECU 33. Arrows depicted in FIG. 4 indicate transition between statues, between modes and between operations.

Firstly, the flow of the electric power supply control in the engine ECU 17 will be described. Referring to FIG. 5, in this control, a flag 1 is pre-set. By turning ON the ignition switch 53, the flag 1 is reset (OFF) (step S11).

The power supply controller 49 determines whether or not the voltage V of the battery 51 which is detected by the voltage detector 52a in the ECU 33 is not more than the first voltage V1 (e.g., 11V) (step S12). To be more specific, the power supply controller 49 determines whether or not the voltage V continues to be not more than the first voltage V1 for a predetermined time (e.g., one second). If it is determined that the voltage V of the battery 51 is not more than the first voltage V1 (Yes in step S12), the power supply controller 49 inhibits the electric power from being supplied to at least one of the non-driving electric motor devices other than the electric motor braking system (step S13, FIG. 4). To be specific, the power supply controller 49 inhibits the electric power from being supplied to one or a plurality of devices from among specified non-driving electric motor devices such as the grip heater 56, the external accessory terminal 55, the electric motor wind shield 57, and the audio 58 (switches from the power supply mode to the power inhibiting mode). It is effective to inhibit the electric power from being supplied to the non-driving electric motor device, for example, grip heater 56, which consumes a greater amount of electric power or operates at a high voltage.

Alternatively, the supply of the electric power may be inhibited in a step-wise manner according to the voltage. For example, the supply of the electric power to the devices may be inhibited in an ascending order of degree of contribution to assistance for driving or in a descending order of the amount of electric power supply consumption. The supply of electric power may be inhibited according to a voltage drop of the battery 51 in the order of the external accessory terminal 55, the grip heater 56 and the electric motor wind shield 57. In a motorcycle including a theft prevention device and driving communication device such as in-vehicle device for ETC, the power supply controller 49 may be configured to keep supplying electric power to the theft prevention device and the driving communication device regardless of the voltage of the battery 51 and inhibit the electric power from being supplied to the remaining non-driving electric motor devices sequentially.

Although the power supply controller 49 may be configured to directly stop supplying the electric power to the other non-driving electric motor devices, when the supply of the electric power is inhibited, it may be configured to control a switching circuit such as a relay circuit for connecting and disconnecting the battery 51 to the other non-driving electric motor devices in order to indirectly control the electric power supply.

If the supply of the electric power to the specified non-driving electric motor devices other than the electric motor braking system is inhibited, the power supply controller 49 determines whether or not the flag 1 is ON (step S14). If it is determined that the flag 1 is not ON (No in step S14), the flag 1 is set to ON (step S15).

In accordance with such a configuration, when the voltage V of the battery 51 is low, the supply of the electric power to the specified non-driving electric motor devices other than the electric motor braking system, which are not directly related to driving of the motorcycle 1, is inhibited. Therefore, the voltage V of the battery 51 can be kept relatively high (state shown in FIG. 7A). This makes it possible to ensure an operating voltage for the electric motor braking system and to increase a period during which the electric motor braking system is operative.

When the voltage V of the battery 51 is not more than the first voltage V1, the power supply controller 49 causes the display device 50 to perform a display operation to indicate a low voltage. For example, when the display device 50 includes a liquid crystal display, the liquid crystal display may perform a display operation to indicate a low voltage. Or, when the display device 50 includes an exclusive low-voltage alarm light, the low-voltage alarm light may light up.

If it is determined that the voltage of the battery 51 is higher than the first voltage V1 (No in step S 12), the power supply controller 49 determines whether or not the flag 1 is ON (step S16). If it is determined that the flag 1 is not ON (No in step S16), the power supply controller 49 maintains an initial state (supply electric power to the specified non-driving electric motor devices).

If it is determined that the voltage V of the battery 51 (voltage detected by the voltage detector 52a) continues to be higher than the first voltage V1 for a predetermined time (e.g., 2 seconds) or longer (No in step S12 and Yes in step S 16), after entering a power supply inhibiting mode in which the power supply controller 49 inhibits the electric power from being supplied to the specified non-driving electric motor devices other than the electric motor braking system, the power supply controller 49 switches the power supply inhibiting mode to the power supply mode and resumes supplying the electric power to the specified non-driving electric motor devices (step S17, FIG. 4). In this case, the power supply controller 49 sets the flag 1 to OFF (step S18). In addition, the power supply controller 49 causes the display device 50 to stop the display operation representing the low voltage.

The power supply controller 49 may switch the power supply inhibiting mode to the power supply mode when the voltage V of the battery 51 reaches a predetermined voltage V0 (e.g., 12V) which is higher than the first voltage V1 (indicated by broken line in FIG. 4). This makes it possible to prevent an event that the electric power is supplied and not supplied to the specified non-driving electric motor devices, which occurs repeatedly, when the voltage V1 of the battery 51 is fluctuating around the first voltage V1.

Next, the flow of the electric power supply control in the ECU 33 will be described. Referring to FIG. 6, in this control, a flag 2 is pre-set. By turning ON the ignition switch 53, the flag 2 is reset (OFF) (step S21). The operation controller 44 in the ECU 33 places the anti-lock operation unit (expressed as ABS in FIGS. 4 and 6) in the normal-voltage mode and the combined braking unit (expressed as CBS in FIGS. 4 and 6) in the operating mode (step S22). The operation controller 44 causes the ABS alarm light to be OFF (step S23).

The operation controller 44 monitors the voltage V of the battery 51 detected by the voltage detector 52b and determines whether or not the voltage V of the battery 51 is not more than a second voltage V2 (e.g., 9.6V) lower than the first voltage V1 (step S24). To be more specific, the operation controller 44 determines whether or not the voltage V continues to be not more than the second voltage V2 for a predetermined time (e.g., one second). If it is determined that the voltage V of the battery 51 is not more than the second voltage V2 (Yes in step S24), the operation controller 44 serving as the controller of the combined braking unit causes the combined braking unit to transition to the operation restricting mode in which the operation of the combined braking unit is stopped (step S25, FIG. 4). The operation controller 44 also serves as a controller for the anti-lock operation unit. When the voltage V of the battery 51 is not more than a third voltage V3 equal to the second voltage V2, the operation controller 44 causes the anti-lock operation unit to transition the low-voltage mode (step S25, FIG. 4).

With the above configuration, the combined braking unit is configured not to be activated and the anti-lock operation unit is configured to switch to the low-voltage mode in which it is operative at a lower voltage than in the normal-voltage mode, if the voltage V of the battery 51 decreases to a lower voltage. This enables the anti-lock operation unit to ensure its operating voltage and to perform the anti-lock operation for a longer time. Furthermore, since the electric power supply control is executed in a stepwise manner according to the voltage V of the battery 51, the electric motor braking system can effectively assist driving of the motorcycle 1.

The ECU 33 causes the anti-lock operation to be performed with less electric power in the low-voltage mode of the anti-lock operation unit than in the normal-voltage mode. For example, in the low-voltage mode of the anti-lock operation unit, the ECU 33 makes the operation cycle (cycle of voltage pulse) of the control valves 61, 62, 67 and 68 longer than in the normal-voltage mode or makes the operation time (pulse duration of voltage pulse) of the control valves 61, 62, 67 and 68 shorter than in the normal-voltage mode. Such control reduces average electric power per unit time which is supplied from the battery 51 to the electric motor braking system. This makes it possible to reduce the amount of electric power required for the anti-lock operation while continuing the anti-lock operation. In the normal-voltage mode of the anti-lock operation unit, the electric motor braking system is operated at a sufficient voltage to allow the electric motor braking system to effectively perform the anti-lock operation, whereas in the low-voltage mode of the anti-lock operation unit, the electric motor braking system is operated at a lower voltage than in the normal-voltage mode, with which the electric motor braking system can effectively suppress a slip.

In the low-voltage mode of the anti-lock operation unit, the operation controller 44 causes the ABS alarm light 501 to perform a display operation to inform the driver that the anti-lock operation unit has transitioned to the low-voltage mode. To be specific, for example, the operation controller 44 causes the ABS alarm light 501 to blink (step S26). In the low-voltage mode of the anti-lock operation unit, the ABS alarm light 501 performs a display operation (blinks) in a different manner from the light-up operation in a normal state, to enable the driver to know that the anti-lock operation unit has transitioned to the low-voltage mode. Although the ABS alarm light 501 is caused to blink to inform the driver that the anti-lock operation unit is in the low-voltage mode, any other suitable display device may be used so long as it can inform the driver that the anti-lock operation unit is in the low-voltage mode. For example, a display device exclusive for the low-voltage mode may be provided or a liquid crystal display may perform a display operation to indicate the low-voltage mode. Instead of blinking, other display methods may be used, for example, a color may be changed.

Turning back to FIG. 4, the anti-lock operation unit is caused to continue the low-voltage mode after it has transitioned to the low-voltage mode until the ignition switch 53 is turned OFF. The combined braking unit is caused to continue the operation restricting mode after it has transitioned to the operation restricting mode until the ignition switch 53 is turned OFF. That is, once the anti-lock operation unit has entered the low-voltage mode and the combined braking unit has entered the operation restricting mode, the anti-lock operation and the combined braking unit will not switch to the normal-voltage mode and the operation mode, respectively, unless the ignition switch 53 is turned OFF and then the ignition switch 53 is turned ON again for resetting (step S21), even if the voltage V of the battery 51 exceeds the second voltage V2 (=third voltage V3) (No in step S24).

As described above, once the anti-lock operation unit has transitioned to the low-voltage mode and the combined braking unit has transitioned to the operation restricting mode, they continue the low-voltage mode and the operation restricting mode, respectively, until the ignition switch 53 is turned OFF even if the voltage V of the battery 51 is restored to a voltage higher than the second voltage V2 (=third voltage V3). It may be estimated that a voltage drop amount of a deteriorated battery is more than a voltage drop amount of an undeteriorated battery at the start of the operation of the anti-lock operation unit and the like, if the voltage V of the battery is raised. If the anti-lock operation unit is operated in the normal-voltage mode or the combined braking unit is operated under situations where the battery is possibly deteriorated or insufficiently charged, a drastic voltage drop of the battery may be induced. Therefore, by causing the operation control unit to maintain the low-voltage mode and the combined braking unit to maintain the operation restricting mode after the voltage V of the battery 51 is not more than the second voltage V2 (=third voltage V3), a drastic voltage drop is prevented, thereby enabling the motorcycle 1 to drive for a longer time.

Once the anti-lock operation unit has transitioned to the low-voltage mode, the ABS alarm light 501 continues blinking until the ignition switch 53 is turned OFF, even if the voltage V of the battery 51 is thereafter restored to the voltage which is not less than the second voltage V2 (=third voltage V3). This enables the driver to notice a possibility that the battery 51 is deteriorated or insufficiently charged.

As described above, the engine ECU 17 and the ECU 33 for electric motor braking operate independently. After the anti-lock operation unit has transitioned to the low-voltage mode and the combined braking unit has transitioned to the operation restricting mode, the operation controller 44 in the engine ECU 17 maintains the low-voltage mode and the operation restricting mode, and the power supply controller 49 in the engine ECU 17 terminates the control for inhibiting the electric power from being supplied to the specified non-driving electric motor devices other than the electric motor braking system, if the voltage V of the battery 51 is restored to a voltage which is not less than the first voltage V1.

The operation controller 44 determines whether or not the voltage V of the battery 51 is not more than the fourth voltage V4 (e.g., 8.5V) lower than the second voltage V2 (=third voltage V3) (step S27). To be specific, the power supply controller 49 determines whether or not the voltage V of the battery 51 continues to be not more than the fourth voltage V4 for a predetermined time (e.g., one second). If it is determined that the voltage V of the battery 51 is not more than the fourth voltage V4 (Yes in step S27), the operation controller 44 inhibits the electric power from being supplied to the electric motor braking system (step S28, FIG. 4). The control for inhibiting the electric power from being supplied to the electric motor braking system may include causing the anti-lock operation unit to transition to the operation restricting mode to inhibit the anti-lock operation unit from performing the anti-lock operation while allowing the combined braking unit to maintain the operation restricting mode.

The operation controller 44 causes the ABS alarm light 501 to light up to alarm that the anti-lock operation unit does not perform the anti-lock operation in a state where the supply of electric power to the electric motor braking system is inhibited (step S29, FIG. 4), to inform the driver that the anti-lock operation is not performed.

If the supply of electric power to the electric motor braking system is inhibited, the operation controller 44 determines whether or not flag 2 is ON (step S30). If it is determined that the flag 2 is not ON (No in step S30), the flag 2 is set to ON (step S31).

As described above, since the electric motor braking system is inhibited from being electrically driven before the voltage V of the battery 51 decreases to a lower voltage (minimum braking voltage VB) with which the anti-lock operation unit cannot ensure its operating voltage, it is possible to increase a period during which the motorcycle 1 can drive.

If it is determined that the voltage V of the battery 51 is higher than the fourth voltage V4, after the anti-lock operation unit of the electric motor braking system has entered the operation restricting mode (No in step S27 and Yes in step 32), the operation controller 44 sets the flag 2 to OFF (step S33), resumes supplying the electric power to the electric motor braking system, and switches the anti-lock operation unit to the low-voltage mode to resume the operation of the anti-lock operation unit while maintaining the combined braking unit in the operation restricting mode (step S25, FIG. 4). In addition, the operation controller 44 causes the ABS alarm light 501 to blink (step S26, FIG. 4).

As should be readily appreciated, since the motorcycle 1 is controlled so that the anti-lock operation unit is operative as long as possible even under a low-voltage condition, it is possible to increase a period during which the electric motor braking system of the motorcycle 1 is operative in situations where the battery 51 is possibly deteriorated or insufficiently charged.

Although the embodiment of the present invention has been described in detail above, the present invention is not limited to the above embodiment but may be modified as follows.

For example, one or a plurality of control process(es), from among the control for inhibiting the electric power from being supplied to the specified non-driving electric motor devices other than the electric motor braking system under the first voltage V1 or less, the control for restricting the operation of the combined braking unit under the second voltage V2 or less, the control for switching the anti-lock operation unit from the normal-voltage mode to the low-voltage mode under the third voltage V3 or less, and the control for inhibiting the electric power from being supplied to the electric motor braking system under the fourth voltage V4 or less, may be performed although all of these are executed in the above embodiment.

Although the case where second voltage V2=third voltage V3 is satisfied has been described above, a relationship of V2>V3 or V2<V3 may be used. With this setting, since the operation of the combined braking operation is restricted in a stepwise manner and the mode of the anti-lock operation unit is switched in a stepwise manner, the electric motor braking system can effectively assist driving of the motorcycle 1.

Although the engine ECU 17 controls the electric power supply to the non-driving electric motor devices and the ECU 33 for electric motor braking controls the operation of the electric motor braking system (anti-lock operation unit and the combined braking unit) such that the ECU 17 and the ECU 33 operate independently of each other, only one of the ECU 17 and the ECU 33 may be used to execute the above explained control, or otherwise the ECU 17 and the ECU 33 may operate in association with each other.

A motorcycle of the present invention is useful in increasing a period during which an electric motor braking system is operative even when a voltage of an electricity accumulator such as a battery is low, in motorcycles including electric motor braking systems, in particular, Tourer-type or cruising-type motorcycles including electric components which consume a large amount of electric power, etc. The present invention is applicable to electric motorcycles and hybrid motorcycles as well as gasoline-fueled motorcycles.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A motorcycle comprising:
    an electricity accumulator configured to supply an electric power to driving devices required for driving of the motorcycle and to non-driving devices;
    a voltage detector configured to detect a voltage of the electricity accumulator; and
    a power supply controller configured to control supply of the electric power;
    the non-driving devices including electric motor devices in an electric motor braking system configured to be electrically driven to assist braking and non-driving electric motor devices other than the electric motor devices in the electric motor braking system; and the power supply controller being configured to inhibit the electric power from being supplied to at least one specified non-driving electric motor device of the non-driving electric motor devices, when the voltage of the electricity accumulator which is detected by the voltage detector is not more than a first predetermined voltage, wherein the electric motor braking system includes an anti-lock operation unit configured to repeatedly switch between a braking state and a non-braking state, and a combined braking unit configured to, when a braking force is applied to one of front and rear wheels, apply the braking force to the other of the front and rear wheels; and wherein the power supply controller is configured to restrict an operation of the combined braking unit while maintaining an operation of the anti-lock operation unit, when the voltage of the electricity accumulator which is detected by the voltage detector is not more than a second predetermined voltage.

2. The motorcycle according to claim 1, wherein the first voltage is not less than the second voltage.

3. The motorcycle according to claim 1,
wherein the electric motor braking system has a normal-voltage mode and a low-voltage mode in which the electric motor braking system is operative at a lower voltage than in the normal-voltage mode; and
wherein the power supply controller is configured to switch the electric motor braking system from the normal-voltage mode to the low-voltage mode when the voltage of the electricity accumulator which is detected by the voltage detector is not more than a third voltage which is not more than the first voltage.

4. A motorcycle comprising:
an electricity accumulator configured to supply an electric power to driving devices required for driving of the motorcycle and to non-driving devices;
a voltage detector configured to detect a voltage of the electricity accumulator; and
a power supply controller configured to control supply of the electric power;
the non-driving devices including electric motor devices in an electric motor braking system configured to be electrically driven to assist braking and non-driving electric motor devices other than the electric motor devices in the electric motor braking system; and
the power supply controller being configured to inhibit the electric power from being supplied to at least one specified non-driving electric motor device of the non-driving electric motor devices, when the voltage of the electricity accumulator which is detected by the voltage detector is not more than a first predetermined voltage,
wherein the electric motor braking system includes an anti-lock operation unit configured to repeatedly switch between a braking state and a non-braking state; and a combined braking unit configured to, when a braking force is applied to one of front and rear wheels, apply the braking force to the other of the front and rear wheels;
wherein the anti-lock operation unit has a normal-voltage mode and a low-voltage mode in which the anti-lock operation unit is operative at a lower voltage than in the normal-voltage mode; and
wherein the power supply controller is configured to restrict an operation of the combined braking unit when the voltage of the electricity accumulator which is detected by the voltage detector is not more than a second predetermined voltage, and cause the anti-lock operation unit to switch from the normal-voltage mode to the low-voltage mode when the voltage of the electricity accumulator which is detected by the voltage detector is not more than a third voltage which is not more than the second voltage.

5. The motorcycle according to claim 4,
wherein the anti-lock operation unit is configured to continue the low-voltage mode from when the anti-lock operation unit has transitioned to the low-voltage mode until an ignition switch is turned OFF.

6. The motorcycle according to claim 4, further comprising:
a display device configured to perform a display operation to inform a driver that the anti-lock operation is in the low-voltage mode.

7. A method of controlling a motorcycle including an electric motor braking system configured to be electrically driven to assist driving of the motorcycle, and an electricity accumulator configured to supply electric power to the electric motor braking system; the electric motor braking system including an anti-lock operation unit configured to repeatedly switch between a braking state and a non-braking state; and a combined braking unit configured to, when a braking force is applied to one of front and rear wheels, apply the braking force to the other of the front and rear wheels, the method comprising:
detecting a voltage of the electricity accumulator; and
restricting an operation of the combined braking unit while maintaining an operation of the anti-lock operation unit, when the voltage of the electricity accumulator is not more than a predetermined voltage.

8. A motorcycle comprising:
an electricity accumulator configured to supply electric power to driving devices required for driving of the motorcycle and to non-driving devices;
a voltage detector configured to detect a voltage of the electricity accumulator; and
a power supply controller configured to control supply of the electric power;
the non-driving devices including electric motor devices in an electric motor braking system configured to be electrically driven to assist braking and non-driving electric motor devices other than the electric motor devices in the electric motor braking system; and
the power supply controller being configured to inhibit the electric power from being supplied to at least one specified non-driving electric motor device of the non-driving electric motor devices, during a state in which the voltage of the electricity accumulator which is detected by the voltage detector is not more than a first predetermined voltage, regardless of whether or not the electric motor braking system is operating, when the detected voltage has become not more than the first predetermined voltage.

9. The motorcycle according to claim 8,
wherein the voltage detector detects the voltage of the electricity accumulator before the electric motor braking system is operated.

10. The motorcycle according to claim 8,
wherein the voltage detector includes a first voltage detector provided independently of the electric motor braking system; and
wherein the power supply controller is configured to inhibit the electric power from being supplied to at least one specified non-driving electric motor device of the non-driving electric motor devices, during a state in which the voltage of the electricity accumulator which is detected by the first voltage detector is not more than the first predetermined voltage, regardless of whether or not the electric motor braking system is operating, when the detected voltage has become not more than the first predetermined voltage.

11. The motorcycle according to claim 8,
wherein the power supply controller is configured to determine whether or not to inhibit the electric power from being supplied to the non-driving electric motor devices other than the electric motor devices, when an ignition switch is turned ON.

12. The motorcycle according to claim 11,
wherein the voltage detector includes a first voltage detector provided independently of the electric motor braking system; and
wherein the first voltage detector, and the power supply controller configured to determine whether or not to inhibit the electric power from being supplied to the non-driving electric motor devices other than the electric motor devices are provided in an engine ECU for executing engine control.

13. The motorcycle according to claim 8,
wherein the voltage detector includes a first voltage detector for detecting a voltage supplied to the non-driving electric motor devices other than the electric motor devices, and a second voltage detector provided independently of the first voltage detector to detect a voltage supplied to the electric motor braking system;
wherein the electric motor braking system includes an anti-lock operation unit configured to repeatedly switch between a braking state and a non-braking state, and a combined braking unit configured to, when a braking force is applied to one of front and rear wheels, apply the braking force to the other of the front and rear wheels; and
wherein the power supply controller is configured to restrict an operation of the combined braking unit, when the voltage of the electricity accumulator which is detected by the second voltage detector is not more than a second predetermined voltage which is not more than the first predetermined voltage.

14. The motorcycle according to claim 13,
wherein the anti-lock operation unit has a normal-voltage mode and a low-voltage mode in which the anti-lock operation unit is operative at a lower voltage than in the normal-voltage mode; and
wherein the power supply controller is configured to switch the anti-lock operation unit from the normal-voltage mode to the low-voltage mode when the voltage of the electricity accumulator which is detected by the second voltage detector is not more than a third predetermined voltage which is not more than the second predetermined voltage.

15. The motorcycle according to claim 8,
wherein the power supply controller is configured to repeatedly determine whether or not to inhibit the electric power from being supplied to the non-driving electric motor devices other than the electric motor devices, during a period in which an ignition switch is ON.

16. The motorcycle according to claim 14, further comprising:
a display device configured to perform a display operation to inform a driver that the anti-lock operation is in the low-voltage mode.

* * * * *